(12) United States Patent
Fukasaku et al.

(10) Patent No.: US 10,738,780 B2
(45) Date of Patent: Aug. 11, 2020

(54) ELECTRIC COMPRESSOR

(71) Applicant: KABUSHIKI KAISHA TOYOTA JIDOSHOKKI, Kariya-shi, Aichi-ken (JP)

(72) Inventors: Hiroshi Fukasaku, Aichi-ken (JP); Yoshiki Nagata, Aichi-ken (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 178 days.

(21) Appl. No.: 15/863,439

(22) Filed: Jan. 5, 2018

(65) Prior Publication Data

US 2018/0216617 A1    Aug. 2, 2018

(30) Foreign Application Priority Data

Jan. 27, 2017 (JP) .................................. 2017-013419

(51) Int. Cl.
   *F04C 23/00* (2006.01)
   *H02K 11/33* (2016.01)
   (Continued)

(52) U.S. Cl.
   CPC ........ *F04C 23/008* (2013.01); *F04C 18/0215* (2013.01); *F04C 27/008* (2013.01);
   (Continued)

(58) Field of Classification Search
   CPC ................ F04C 18/0215; F04C 23/008; F04C 2240/803; F04C 2240/808; F04C 29/045;
   (Continued)

(56) References Cited

U.S. PATENT DOCUMENTS

| 4,886,435 A | 12/1989 | Sawai et al. |
| 9,068,563 B2 * | 6/2015 | Fukasaku ................ F04B 17/03 |

(Continued)

FOREIGN PATENT DOCUMENTS

| JP | 63-235689 A | 9/1988 |
| JP | 02-078784 A | 3/1990 |

(Continued)

OTHER PUBLICATIONS

Communication dated Jan. 22, 2019 issued by the Korean Intellectual Property Office in counterpart application No. 10-2018-0009285.

*Primary Examiner* — Peter J Bertheaud
(74) *Attorney, Agent, or Firm* — Sughrue Mion, PLLC

(57) ABSTRACT

An electric compressor includes a compression portion, an electric motor portion, a motor drive circuit portion, and a housing in which the compression portion, the electric motor portion, and the motor drive circuit portion are arranged in this order in an axial direction. The electric compressor further includes a partition wall, a refrigerant inlet, and a conductive member. The refrigerant inlet is disposed at a position in the housing closer to a partition wall than to the compression portion. The conductive member electrically connects the motor drive circuit portion and the electric motor portion. The electric compressor includes a shield member configured to block flow of refrigerant taken in through the refrigerant inlet and flowing toward the conductive member. The shield member is disposed in the electric motor portion so as to be located between the refrigerant inlet and the conductive member.

7 Claims, 10 Drawing Sheets

(51) Int. Cl.
*F04C 18/02* (2006.01)
*F04C 27/00* (2006.01)
*H02K 5/22* (2006.01)

(52) U.S. Cl.
CPC ............. *H02K 5/225* (2013.01); *H02K 11/33* (2016.01); *F04C 2240/40* (2013.01); *F04C 2240/808* (2013.01)

(58) Field of Classification Search
CPC .......... F04C 29/047; H02K 3/38; H02K 3/50; H02K 5/225; H02K 11/33
See application file for complete search history.

(56) References Cited

U.S. PATENT DOCUMENTS

| | | | | |
|---|---|---|---|---|
| 9,194,394 | B2 * | 11/2015 | Yamada | ................... F04C 23/02 |
| 9,234,527 | B2 * | 1/2016 | Fukasaku | ............ F04D 29/5806 |
| 9,243,638 | B2 * | 1/2016 | Mera | ....................... F04C 23/02 |
| 9,394,907 | B2 * | 7/2016 | Fukasaku | ............... F04C 23/008 |
| 9,574,560 | B2 * | 2/2017 | Adaniya | ................... H02K 3/50 |
| 9,670,927 | B2 * | 6/2017 | Kii | ....................... F04C 18/0207 |
| 2014/0003974 | A1 | 1/2014 | Fukasaku et al. | |
| 2014/0093408 | A1 * | 4/2014 | Adaniya | ................... H02K 3/50 |
| | | | | 417/410.5 |

FOREIGN PATENT DOCUMENTS

| | | |
|---|---|---|
| JP | 03-003995 A | 1/1991 |
| JP | 08-093662 A | 4/1996 |
| JP | 2706516 B2 | 1/1998 |
| JP | 2005-201108 A | 7/2005 |
| JP | 2014-034918 A | 2/2014 |
| KR | 10-2014-0001755 A | 1/2014 |

* cited by examiner

ELECTRIC COMPRESSOR

BACKGROUND OF THE INVENTION

The present invention relates to an electric compressor.

Japanese Patent Application Publication No. H02-78784 discloses a hermetic electric compressor that includes a sealed container having therein a compression element and an electric element. The sealed container further has a hermetic terminal for supplying electric power from an external power source to the electric element and a partition plate (a baffle plate) that is disposed in the sealed container and blocks the flow of refrigerant taken in through an inlet pipe and flowing toward the hermetic terminal. The hermetic electric compressor of the Publication is configured to prevent the refrigerant that is taken in through the intake pipe from flowing to the hermetic terminal to thereby prevent condensation of the moisture on and around the hermetic terminals.

Since the hermetic electric compressor of the Publication No. H02-78784 is adapted for use in a home appliance and installed through a mounting base, there is a sufficient space in the sealed container. Therefore, it is relatively easy to install a partition plate (a baffle plate) in the sealed container.

Meanwhile, in the case of an electric compressor for a vehicle such as an automobile, a compression portion that compresses refrigerant, an electric motor portion that drives the compression portion, and a motor drive circuit portion that drives the electric motor portion are integrated. Recently, demand for reduction in the size and weight of the electric compressor is increasing. Under such circumstances, there has been proposed an electric compressor of a substantially cylindrical shape and including a housing in which a compression portion, an electric motor portion, and a motor drive circuit portion are disposed serially in a direction.

This type of electric compressor is made small in both radial and axial directions. Therefore, the space for disposing components and the space between components are limited. Therefore, it is difficult to provide a sufficient space between the refrigerant inlet and the conductive members inserted through a partition wall separating the electric motor portion from the motor drive circuit portion. It is also difficult to dispose the conductive member sufficiently spaced away from the flow of the refrigerant that is taken in through the refrigerant inlet. As a result, the conductive member may be cooled by the refrigerant that is taken in through the refrigerant inlet and the moisture may condense on and around the conductive member on the motor drive circuit portion side, which may result in poor electrical insulation. It may be contemplated to provide a shield plate in the housing for blocking such flow of refrigerant. Unlike an electric compressor for a home appliance, in the case of an electric compressor for a vehicle, there is not a sufficient space available for installing a shield plate in the housing. To be more specific, it is difficult to assemble an electric motor portion to the housing in which a shield plate has been previously installed. Furthermore, there arise problems that the ease of assembly of the electric compressor as a whole is lowered and that the installation of a shield plate involves an increase in the space of the housing and hence the size of the electric compressor as a whole.

The present invention which has been made in view of the circumstances above is directed to providing an electric compressor which is capable of preventing condensation of the moisture on and around the part of the conductive member located on the drive circuit side and enhancing the ease of assembly of the electric compressor, while preventing an increase in the size of the compressor.

SUMMARY OF THE INVENTION

In accordance with an aspect of the present invention, there is provided an electric compressor that includes a compression portion, an electric motor portion, a motor drive circuit portion, and a housing. The compression portion compresses refrigerant with rotation of a rotary shaft. The electric motor portion includes a stator core on which a coil is wound and a rotor coupled to the rotary shaft. The electric motor portion drives the compression portion through the rotary shaft. The motor drive circuit portion drives the electric motor portion. The compression portion, the electric motor portion, and the motor drive circuit portion are arranged in this order in the housing in an axial direction of the rotary shaft. The electric compressor further includes a partition wall, a refrigerant inlet, and a conductive member. The partition wall forms a part of the housing and separates the electric motor portion from the motor drive circuit portion. The refrigerant inlet is disposed at a position in the housing that is closer to the partition wall than to the compression portion. The conductive member is provided through the partition wall and electrically connects the motor drive circuit portion and the electric motor portion. The electric compressor further includes a shield member configured to block flow of refrigerant taken in through the refrigerant inlet and flowing toward the conductive member. The shield member is disposed in the electric motor portion so as to be located between the refrigerant inlet and the conductive member.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiments together with the accompanying drawings in which.

DETAILED DESCRIPTION OF THE EMBODIMENTS

First Embodiment

Figure 1:
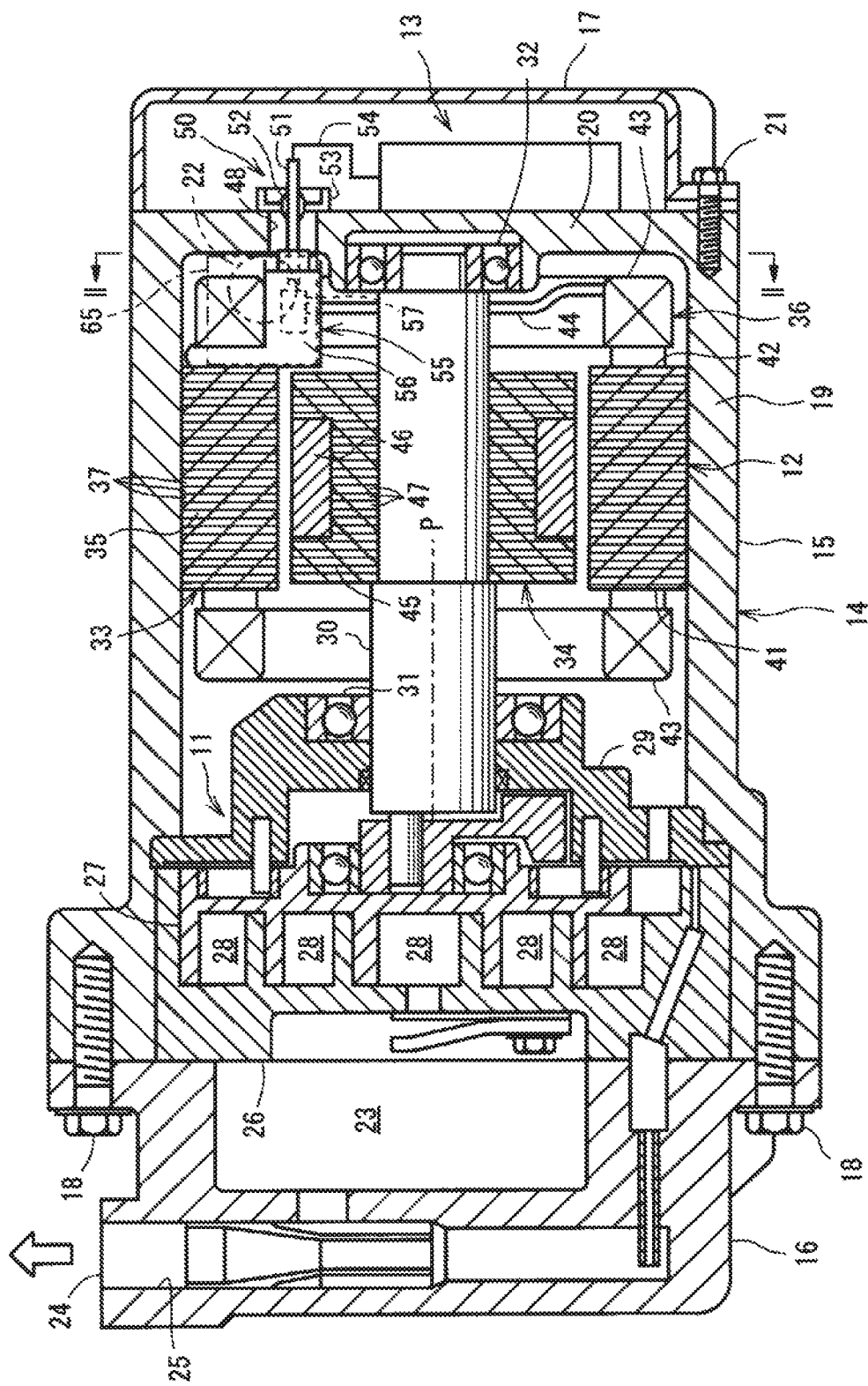
FIG. 1 is a longitudinal sectional view of an electric compressor according to a first embodiment of the present invention.

The following will describe an electric compressor according to a first embodiment of the present invention with reference to FIGS. 1 to 4. The electric compressor according to the first embodiment is a vehicle electric compressor which is adapted for use in a hybrid vehicle including an electric traction motor and an internal combustion engine as the drive sources of the vehicle. The electric compressor forms a part of a refrigerant circuit of an air conditioning system (not shown) of the vehicle. Although not shown in the drawings, the air conditioning system includes the electric compressor, a condenser, a receiver, a cooling unit having an expansion valve and an evaporator, and pipes connecting these components to each other.

Referring to FIG. 1, the electric compressor includes a compression portion 11 that compresses refrigerant as a fluid, an electric motor portion 12 for the electric compressor that drives the compression portion 11, and a motor drive circuit portion 13 that drives the electric motor portion 12. The compression portion 11 the electric motor portion 12, and the motor drive circuit portion 13 are integrated as a unit. The electric compressor includes a metallic housing 14. In the first embodiment, the housing 14 is made of an aluminum-based metal. The electric compressor according to the first embodiment is so-called an in-line compressor having the compression portion 11, the electric motor portion 12, and the motor drive circuit portion 13 arranged in this order in a direction in the housing 14 of the electric compressor. In particular, in the electric compressor according to the first embodiment, the compression portion 11 the electric motor portion 12, and the motor drive circuit portion 13 are arranged in the axial direction of a rotary shaft 30 of the electric compressor, which will be described later.

The housing 14 includes a cylindrical first housing member 15 having a closed end, a second housing member 16 that closes an opening of the first housing member 15 opposite to the closed end thereof, and a third housing member 17 that is coupled to the first housing member 15 and accommodates therein the motor drive circuit portion 13. The first housing member 15 and the second housing member 16 are fixed to each other by bolts 18 after the end surface of the first housing member 15 opposite to the closed end thereof and an end surface of the second housing member 16 are joined together so that an integral body is formed. The first housing member 15 includes a cylinder portion 19 having a cylindrical shape and a bottom portion 20 that is formed integral with the cylinder portion 19 and closes one end of the cylinder portion 19 near the motor drive circuit portion 13. The third housing member 17 is fixed to the bottom portion 20 of the first housing member 15 with bolts 21 (only one bolt 21 is shown in FIG. 1) to form an integral body. The bottom portion 20 of the first housing member 15 corresponds to the partition wall of the present invention that separates the electric motor portion 12 from the motor drive circuit portion 13. It is noted that the electric compressor according to the first embodiment is mounted horizontally in an engine compartment of the vehicle.

The compression portion 11 and the electric motor portion 12 are accommodated in the first housing member 15 of the electric compressor. The cylinder portion 19 of the first housing member 15 has a refrigerant inlet 22 at a position closer to the bottom portion 20 than to the compression portion 11. The refrigerant inlet 22 is connected to an external refrigerant circuit (not shown) so that the external refrigerant circuit communicates with the inside of the first housing member 15. During the operation of the electric compressor, refrigerant of a low pressure is flowed from the external refrigerant circuit into the first housing member 15, which serves as a motor chamber and a suction chamber, through the refrigerant inlet 22.

The second housing member 16 has therein a discharge chamber 23 which is communicable with the compression portion 11. The second housing member 16 has in an upper part thereof an outlet 24 which communicates with the external refrigerant circuit. The second housing member 16 has therein a communication passage 25 that provides communication between the discharge chamber 23 and the outlet 24. During the operation of the electric compressor, refrigerant compressed to a high pressure in the compression portion 11 is discharged to the discharge chamber 23, flowed to the outlet 24 through the communication passage 25, and then delivered to the external refrigerant circuit through the outlet 24.

The compression portion 11 includes a fixed scroll 26 which is fixed in the first housing member 15 and a movable scroll 27 that orbits relative to the fixed scroll 26. The fixed scroll 26 and the movable scroll 27 cooperate to form a compression chamber 28 therebetween. The refrigerant that is taken into the first housing member 15 through the refrigerant inlet 22 is then introduced into the compression chamber 28. The movable scroll 27 is driven by the electric motor portion 12 to orbit. With the orbiting of the movable scroll 27 the volume of the compression chamber 28 is varied.

A shaft support member 29 is disposed between the electric motor portion 12 and the fixed scroll 26 in the first housing member 15. The shaft support member 29 forms a part of the compression portion 11 and supports one end portion of the rotary shaft 30 of the electric motor portion 12 through a bearing 31. The other end portion of the rotary shaft 30 is supported by the bottom portion 20 of the first housing member 15 through a bearing 32. The bottom portion 20 has a flat surface that faces the third housing member 17 and extends perpendicularly to the axis of the rotary shaft 30.

The electric motor portion 12 is driven by a three-phase AC power. The electric motor portion 12 includes a stator 33 and a rotor 34 that is inserted in the stator 33 and mounted on the rotary shaft 30 for rotation therewith in the stator 33. The stator 33 includes an annular stator core 35 fixed to the inner peripheral surface of the first housing member 15 and coils 36 wound around the stator core 35. The stator core 35 includes a plurality of laminated magnetic core plates 37 (electromagnetic steel plates).

Figure 2:
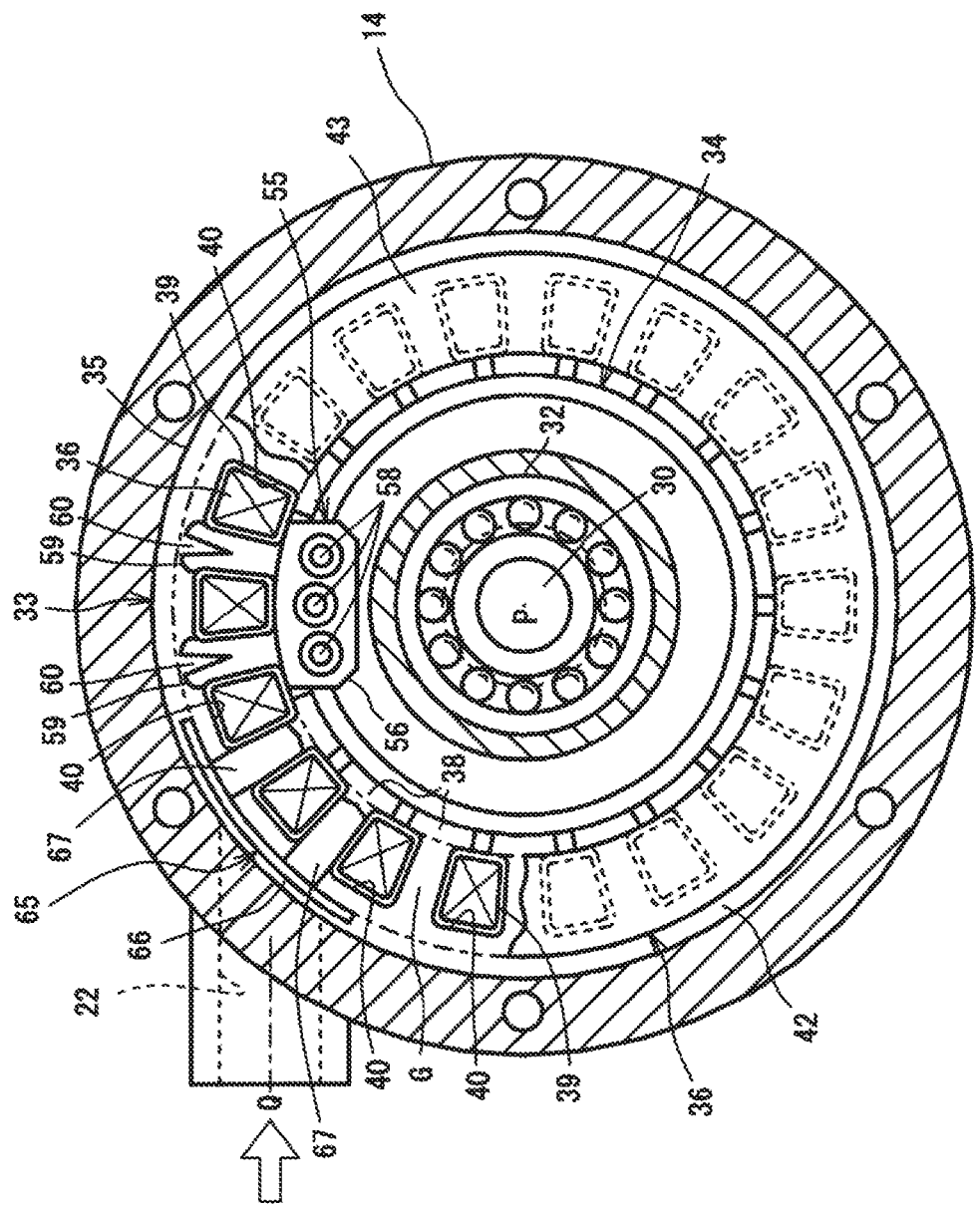
FIG. 2 is a transverse sectional view taken along line II-II of FIG. 1.

As shown in FIG. 2, each core plate 37 has in an inner circumference thereof a plurality of projecting teeth 38 formed at equal intervals in the circumferential direction of the core plate 37. Slots 40 are formed between the teeth 38 at equal intervals in the circumferential direction of the stator core 35. The slots 40 accommodate the coils 36, which are wound around the teeth 38. A tubular insulation sheet 39 is arranged between the tooth 38 and the coil 36 in each slot 40. Each insulation sheet 39 extends in the direction of the axial line P of the rotary shaft 30 in the corresponding slot 40. Each insulation sheet 39 includes two end portions projecting out from opposite axial end surfaces 41 and 42 of the stator core 35.

Each insulation sheet 39 has at the opposite end portions thereof cuffs (not shown) each having a bent end. The cuffs are hooked at the bent end to the opposite end surfaces 41 and 42 of the stator core 35. The insulation sheets 39 hooked to the end surfaces 41 and 42 of the stator core 35 are prevented from being displaced in the axial direction in the slots 40 relative to the stator core 35. Each coil 36 of the electric motor portion 12 has opposite coil ends 43 that project out from the stator core 35. Lead wires 44 for U, V, and W phases (only one lead wire 44 is shown in FIG. 1) extend from the coil end 43 near the motor drive circuit portion 13. The refrigerant inlet 22 is oriented toward the coil end 43 near the motor drive portion 13 so that at least part of the opening of the refrigerant inlet 22 faces toward the coil end 43, i.e. so that at least part of the opening of the refrigerant inlet 22 overlaps with the coil end 43 as viewed in the axial direction. The coil end 43 near the motor drive circuit portion 13 and the bottom portion 20 of the first housing member 15 are spaced away from each other at a specified distance for insulation, the bearing 32 and the coil end 43 near the motor drive circuit portion 13 overlap with each other as viewed in a radial direction of the housing 14. In other words, the bearing 32 and the coil end 43 are arranged so as to prevent an increase in the dimension of the electric compressor in the direction of the axial line P.

As shown in FIG. 2, gaps G are formed in the axial direction between the end surface 42 (the teeth 38) of the stator core 35 and the coil end 43 near the motor drive circuit portion 13 and between the end surface 41 (the teeth 38) of the stator core 35 and the coil end 43 near the compression portion 11 (i.e., the coil end 43 located between the stator core and the compression portion 11 in the axial direction). The gaps G are located between adjacent insulation sheets 39 in the circumferential direction of the stator core 35. The gaps G are voids that are formed by the end portions of the insulation sheets 39 projecting out from the end surfaces 41 and 42 and defined by the coil ends 43 and arranged in the circumferential direction of the stator core 35. The gaps G ensure insulation between the end surfaces 41, 42 of the stator core 35 and the coil ends 43.

The rotor 34 includes a cylindrical rotor core 45 and is fixed on the rotary shaft 30. A plurality of permanent magnets 46 is embedded in the rotor core 45. The permanent magnets 46 are arranged in the circumferential direction of the rotor core 45 at equal intervals. The rotor core 45 includes a plurality of laminated magnetic core plates 47 (electromagnetic steel plates).

A through hole 48 is formed through the bottom portion 20 of the first housing member 15. A hermetic terminal 50 is disposed in the through hole 48. The hermetic terminal 50 includes three sets of a metallic terminal 51 as the conductive member of the present invention and an insulation member 52 (only one set is shown in FIG. 1). The electric motor portion 12 and the motor drive circuit portion 13 are electrically connected to each other through the metallic terminals 51. The metallic terminals 51 are fixed to a support plate 53 that is fixed to the surface of the bottom portion 20 facing the third housing member 17. Each insulation member 52 fixes its corresponding metallic terminal 51 to the support plate 53 and insulates the metallic terminal 51 from the support plate 53. One end of each metallic terminal 51 is electrically connected to the motor drive circuit portion 13 via a cable 54 and the other end of the metallic terminal 51 extends into the first housing member 15. The motor drive circuit portion 13 is accommodated in a space defined by the bottom portion 20 of the first housing member 15 and the third housing member 17. The conditions such as temperature and pressure in the space correspond to those in the atmosphere.

The first housing member 15 has therein a rectangular box-shaped cluster block 55. The cluster block 55 is disposed radially inward of the coil ends 43 and coupled to the stator 33. The cluster block 55 forms a part of the electric motor portion 12. The cluster block 55 includes a main body 56 made of an insulating resin. A connection terminal 57 is accommodated in the main body 56 of the cluster block 55. Each lead wire 44 is connected at its one end to the connection terminal 57. Three insertion holes 58 are formed through an end surface of the main body 56 that is located near the motor drive circuit portion 13. The other ends of the metallic terminals 51 are inserted through their corresponding insertion holes 58 and electrically connected to the connection terminal 57.

As shown in FIG. 2, the main body 56 of the cluster block 55 includes two projections 59 extending radially outward from the main body 56 and adapted to be inserted into the corresponding gaps G. Each projection 59 has a notch 60 in a distal end thereof. The notch 60 is formed to extend from the distal end of the projection 59 toward the proximal end. The length of the projection 59 inserted in the gap G as measured from the main body 56 of the cluster block 55 is set such that the distal end of the projection 59 is located radially outward of the slots 40. The projections 59 as inserted in the gaps G are held between the coil end 43 and the stator core 35. In this way the cluster block 55 is mounted to the stator 33.

As shown in FIG. 2, the cluster block 55 is coupled to the stator 33 in such a manner that the main body 56 of the cluster block 55 is located at a position approximate to the axial line Q of the refrigerant inlet 22.

A shield plate 65 as the shield member of the present invention is mounted along a part of the outer periphery of the coil end 43 near the motor drive circuit portion 13. The shield plate 65 is adapted to block the flow of refrigerant that is taken in through the refrigerant inlet 22 and flowing toward the metallic terminals 51 to thereby prevent the metallic terminals 51 from being cooled. The shield plate 65 includes a rectangular body portion 66 and a plurality of engaging portions 67 formed integrally with the body portion 66. The engaging portions 67 are adapted to be engaged with the coil end 43 near the motor drive circuit portion 13. The shield plate 65 is made of an insulating resin having resistance properties against refrigerant.

Figure 3A:
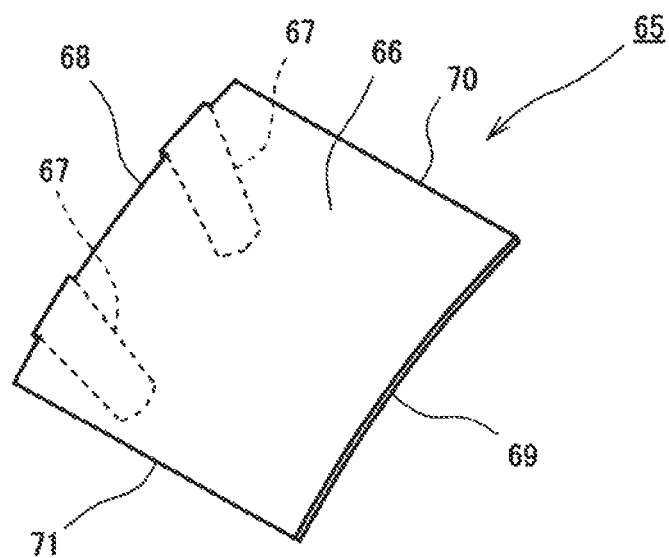
FIG. 3A is a perspective view of a shield plate as viewed from an outer peripheral side thereof.
Figure 3B:
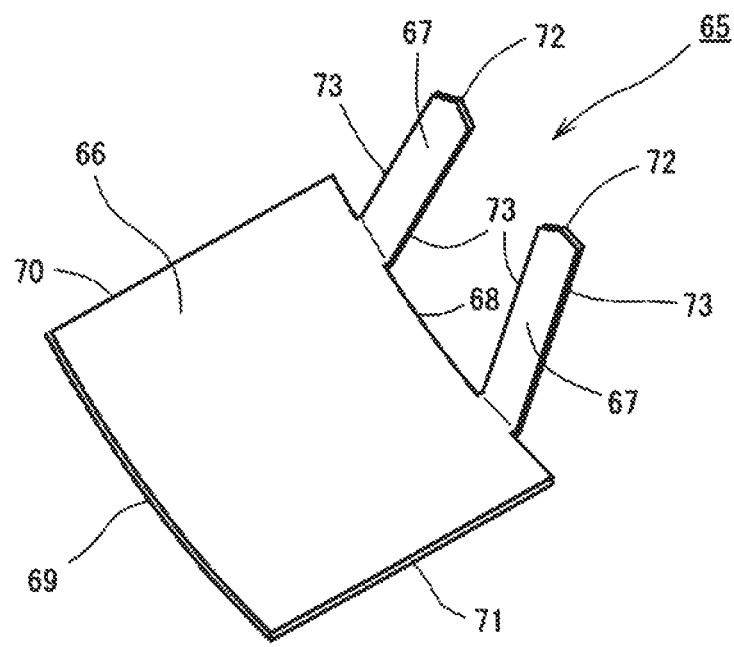
FIG. 3B is a perspective view of the shield plate as viewed from an inner peripheral side thereof.

The shield plate 65 is mounted on the outer periphery of the coil end 43 in such a manner that the body portion 66 of the shield plate 65 is located between the refrigerant inlet 22 and the cluster block 55, and the coil end 43 near the motor drive circuit portion 13 is located between the body portion 66 and the cluster block 55. As shown in FIGS. 3A and 3B, the body portion 66 has four edges, namely, a first edge 68, a second edge 69, a third edge 70, and a fourth edge 71. The first edge 68 and the second edge 69 are opposite to each other in the axial direction of the rotary shaft 30, and the third edge 70 and the fourth edge 71 are opposite to each other in the circumferential direction of the coil end 43. The distance between the first edge 68 and the second edge 69 is slightly smaller than the distance between the end surface 42 of the stator core 35 and the inner wall surface of the bottom portion 20 of the first housing member 15. Meanwhile, the distance between the third edge 70 and the fourth edge 71 corresponds to approximately 10% of the circumference of the coil end 43. Therefore, the body portion 66 of the shield plate 65 according to the first embodiment has an area that is sufficiently larger than the area of opening of the refrigerant inlet 22.

The engaging portions 67 of the shield plate 65 are formed so as to extend from the edge (the first edge 68) of the body portion 66 on the end surface 42 side in a direction perpendicular to the plane of the body portion 66. Each engaging portion 67 has a tip end 72 and two opposite lateral edges 73. The dimension of the engaging portion 67 as measured between the first edge 68 and the tip end 72 is substantially the same as the dimension of the coil end 43 in the radial direction. The width of each engaging portion 67, i.e., the distance between the opposite lateral edges 73 of each engaging portion 67 is slightly greater than the dimension of each gap G as measured in the circumferential direction of the stator core 35. Therefore, the engaging portions 67 inserted in the gap G elastically deform in such a manner as to reduce the width thereof. The lateral edges 73 of the engaging portions 67 thus elastically deformed are pressed against the coil end 43. By the elastic action of the engaging portions 67, the shield plate 65 is held by the coil end 43. In short, the shield plate 65 is mounted to the electric motor portion 12 by inserting the engaging portions 67 into the gaps G in the coil end 43. Furthermore, since the shield plate 65 is mounted so that the body portion 66 faces the opening of the refrigerant inlet 22, the refrigerant taken in through the refrigerant inlet 22 is blown onto the body portion 66 of the shield plate 65 in the direction in which the engaging portions 67 are inserted. This prevents the shield plate 65 from coming off from the coil end 43.

Figure 4A:
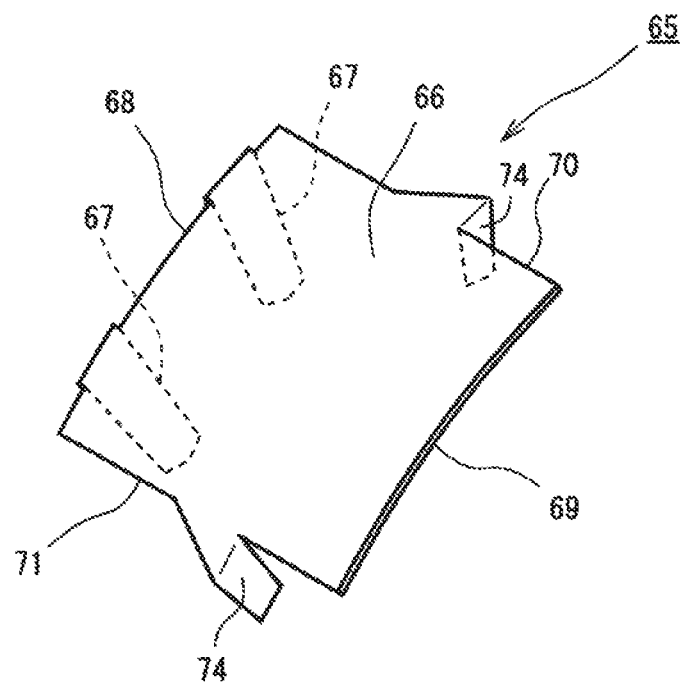
FIG. 4A is a perspective view of a shield plate according to a variant of the first embodiment as viewed from an outer peripheral side thereof.
Figure 4B:
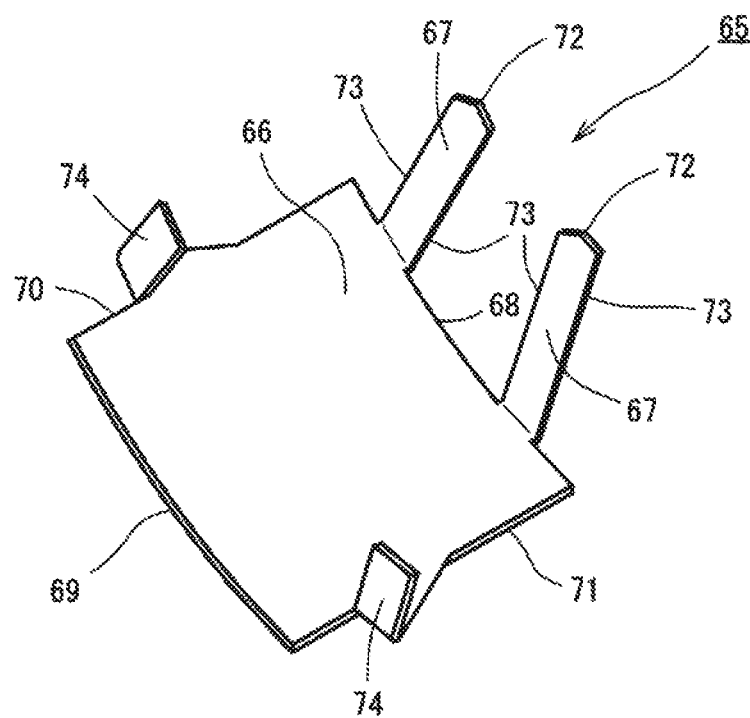
FIG. 4B is a perspective view of the shield plate of FIG. 4A as viewed from an inner peripheral side thereof.

It is to be noted that the shield plate 65 may include a pair of contacting portions 74 that is contactable with end surface of the coil end 43 facing the bottom portion 20 of the first housing member 15, as shown in FIGS. 4A and 4B as a variant of the present embodiment. The contacting portions 74 extend out from the third and fourth edges 70, 71, respectively, by being bent away from the plane of the body portion 66. The contacting portions 74 enable the shield plate 65 to be mounted securely to the coil end 43.

The following will describe the function of the electric compressor according to the first embodiment. When the electric compressor is started, refrigerant of low pressure is taken into the first housing member 15 through the refrigerant inlet 22. The refrigerant flows along the coil end 43 near the motor drive circuit portion 13, between the coil end 43 and the bottom portion 20 of the first housing member, and between gaps G. Then the refrigerant flows through the electric motor portion 12 and then is taken into the compression chamber 28 and compressed. The refrigerant compressed into a high pressure in the compression chamber 28 is discharged to the discharge chamber 23, flowed through the communication passage 25, and then discharged to the external refrigerant circuit through the outlet 24.

The refrigerant taken in through the refrigerant inlet 22 is flowed through the refrigerant inlet 22 along the axial line Q of the refrigerant inlet 22 indicated by the blank arrow of FIG. 2. The shield plate 65 mounted on the coil end 43 near the motor drive circuit portion 13 is located between the refrigerant inlet 22 and the metallic terminals 51, or between the refrigerant inlet 22 and the cluster block 55. With this arrangement, the flow of the refrigerant flowing along the axial line Q is blocked by the shield plate 65. Therefore, part of the cluster block 55 which is located close to the refrigerant inlet 22 is not directly exposed to the flow of the refrigerant flowing from the refrigerant inlet 22. Because the cluster block 55 is not directly exposed to the refrigerant flowing along the axial line Q, the metallic terminals 51 inserted in the cluster block 55 are prevented from being cooled excessively. As a result, condensation of the moisture hardly occurs on and around the metallic terminals 51 of the motor drive circuit portion 13.

The electric compressor according to the first embodiment offers the following effects.

(1) The shield plate 65 mounted to the electric motor portion 12 blocks the flow of the refrigerant taken in through the refrigerant inlet 22 and flowing toward metallic terminals 51 thereby preventing the metallic terminals 51 from being exposed directly to the refrigerant. As a result, the metallic terminals 51 are prevented from being cooled and condensation of the moisture is prevented on and around the part of the metallic terminals 51 near the motor drive circuit portion 13. The shield plate 65 is mounted to the coil end 43 of the electric motor portion 12. It is easier to mount the shield plate 65 to the coil end 43 than to mount the shield plate 65 to the housing 14. Mounting the shield plate 65 to the coil end 43 also enhances the ease of assembly of the electric compressor. Furthermore, with the shield plate 65 that is adapted to be mounted in a limited space between the stator 33 and the bottom portion 20 of the first housing member 15, an increase in the size of the electric compressor itself is prevented.

(2) The shield plate 65 includes the body portion 66 that blocks the flow of refrigerant and the engaging portions 67 formed integrally with the body portion 66 and adapted to be engaged with the coil end 43. The shield plate 65 is mounted to the electric motor portion 12 by engaging the engaging portions 67 with the coil end 43. Therefore, the mounting the shield plate 65 to the electric motor portion 12 does not require any fixing members.

(3) The body portion 66 of the shield plate 65 has an area larger than the opening area of the refrigerant inlet 22. Therefore, the body portion 66 blocks the flow of refrigerant taken in through the refrigerant inlet 22 and flowing toward the metallic terminals 51 securely.

(4) The shield plate 65 is disposed between the cluster block 55 and the refrigerant inlet 22. Therefore, the shield plate 65 blocks the flow of refrigerant taken in through the refrigerant inlet 22 and flowing toward the cluster block 55, or flowing in the direction in which the metallic terminals 51 are inserted. With this configuration, the cluster block 55 and hence the metallic terminals 51 inserted in the cluster block 55 are prevented from being cooled.

(5) The refrigerant inlet 22 is disposed so as to face toward the coil end 43, and part of the opening of the refrigerant inlet 22 and the coil end 43 overlap with each other as viewed in the axial direction. With this configuration, the space between the refrigerant inlet 22 and the coil end 43 is reduced, and hence the size of the electric compressor is reduced. Although there are some constraints in the manner of arrangement, the electric motor portion 12 permits mounting of the shield plate 65 thereon in such a manner as to block the flow of refrigerant.

Second Embodiment

Figure 5:
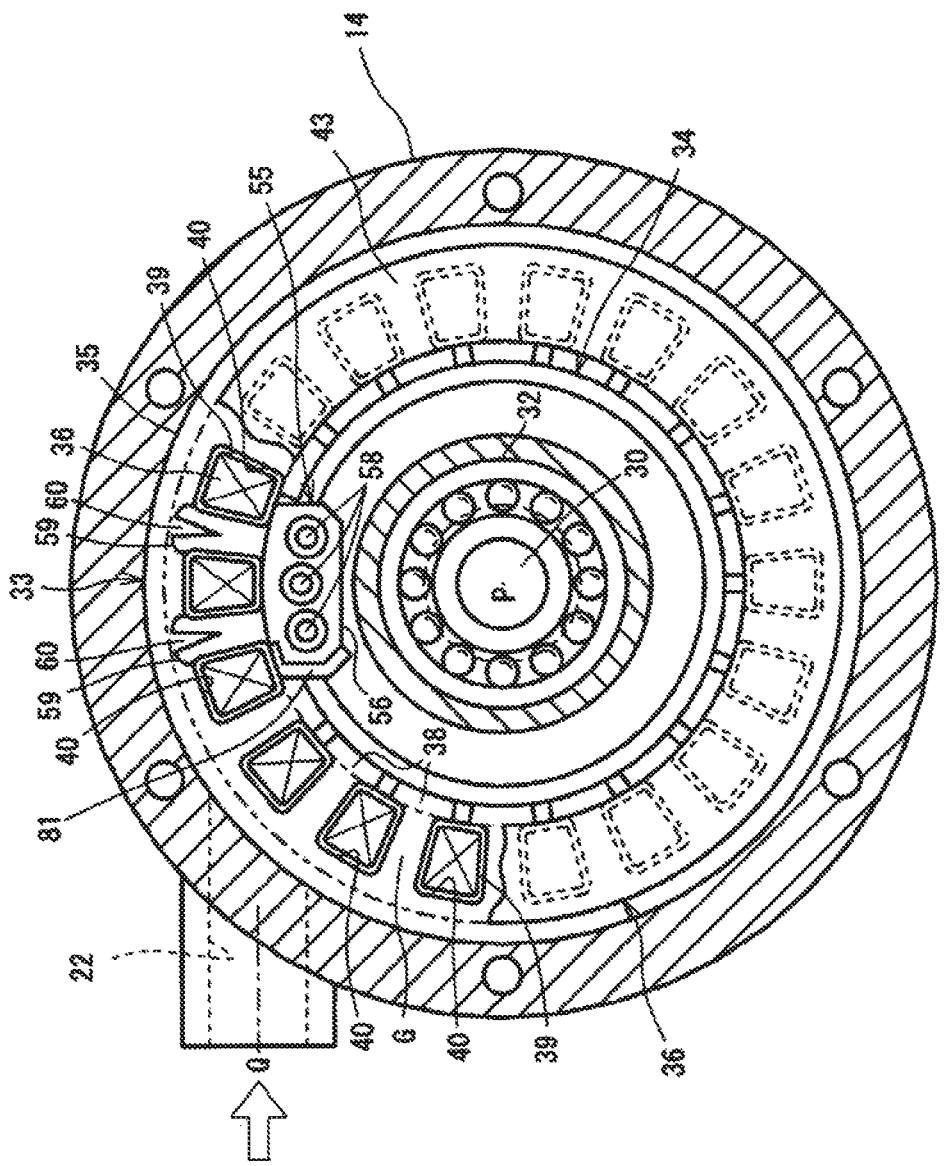
FIG. 5 is a transverse sectional view of an electric compressor according to a second embodiment of the present invention taken similarly to FIG. 2.
Figure 6:
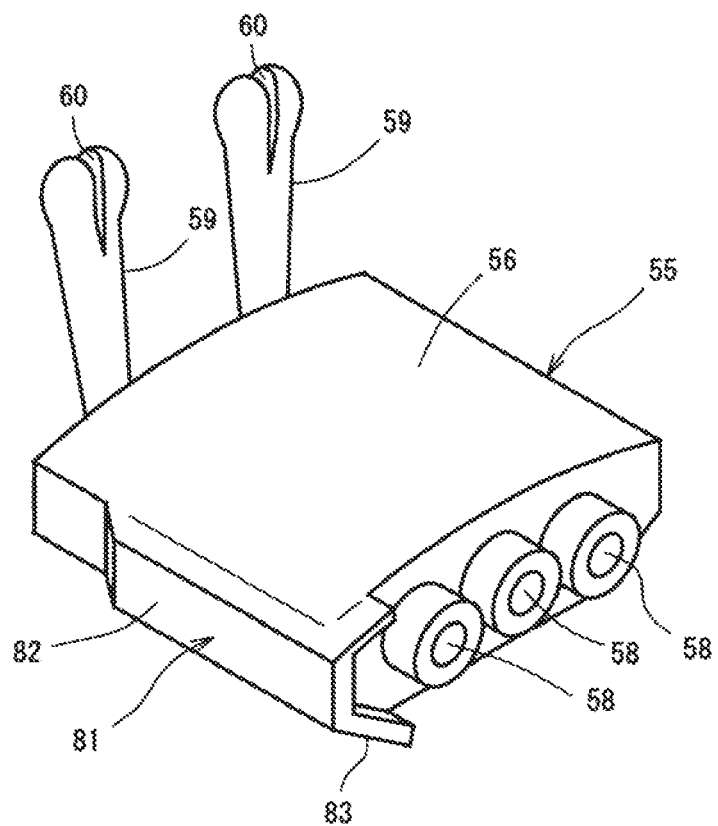
FIG. 6 is a perspective view of a cluster block and a shield member according to the second embodiment of the present invention.

The following will describe an electric compressor according to a second embodiment of the present invention with reference to FIGS. 5 and 6. The electric compressor according to the second embodiment differs from the electric compressor according to the first embodiment in that the shield member is integrated with the cluster block. Therefore, the configuration and the components that correspond to those of the first embodiment will be designated by the same reference numerals and the detailed description thereof may be omitted or simplified.

According to the electric compressor of the second embodiment, a rectangular box-shaped cluster block 55 is disposed radially inward of the coil ends 43 and mounted to the stator 33 in the first housing member 15, as shown in FIG. 5. The cluster block 55 has a shield portion 81 which is formed integrally with the cluster block 55 on the side thereof adjacent to the refrigerant inlet 22. The shield portion 81 corresponds to the shield member of the present invention.

The shield portion 81 is located between the metallic terminals 51 and the refrigerant inlet 22, or between the refrigerant inlet 22 and the cluster block 55. The shield portion 81 includes a thick-walled portion 82 and a projecting portion 83. The thick-walled portion 82 is formed on the part of the main body 56 of the cluster block 55 located near the refrigerant inlet 22. The projecting portion 83 is formed as an extension of the thick-walled portion 82 and projects from the end surface of the main body 56 having the insertion holes 58 in the axial direction of the electric compressor. The thick-walled portion 82 prevents a portion of the main body 56 near the refrigerant inlet 22 from being directly exposed to the flow of the refrigerant. That is, the thick-walled portion 82 prevents the metallic terminals 51 inserted in the cluster block 55 from being cooled. The projecting portion 83 blocks the flow of refrigerant from the refrigerant inlet 22 to thereby prevent the part of the metallic terminals 51 at or around the insertion holes 58 of the cluster block 55 from being cooled.

According to the second embodiment, the shield portion 81 is located between the metallic terminals 51 and the refrigerant inlet 22, or, between the refrigerant inlet 22 and the cluster block 55. Therefore, the shield portion 81 blocks the flow of refrigerant taken in through the refrigerant inlet 22 and flowing toward the metallic terminals 51 and the cluster block 55. With this configuration, the cluster block 55 and hence the metallic terminals 51 inserted in the cooled cluster block 55 are prevented from being cooled.

The shield portion 81 is provided to the part of the cluster block 55 near the refrigerant inlet 22. The thus-disposed shield portion 81 blocks the flow of refrigerant taken in through the refrigerant inlet 22 and flowing toward the metallic terminals 51 and the cluster block 55, with the result that the cluster block 55, especially the part of the cluster block 55 bear the refrigerant inlet 22 is prevented from being cooled.

The shield portion 81 is formed integrally with the cluster block 55, which contributes to the reduction of the number of parts and components used in the electric compressor. The reduced number of parts and components enhances the ease of assembly of the electric compressor. Furthermore, with the shield portion 81 that is adapted to be disposed in the limited space between the stator 33 and the bottom portion 20 of the first housing member 15, an increase of the size of the electric compressor is prevented.

Third Embodiment

Figure 7:
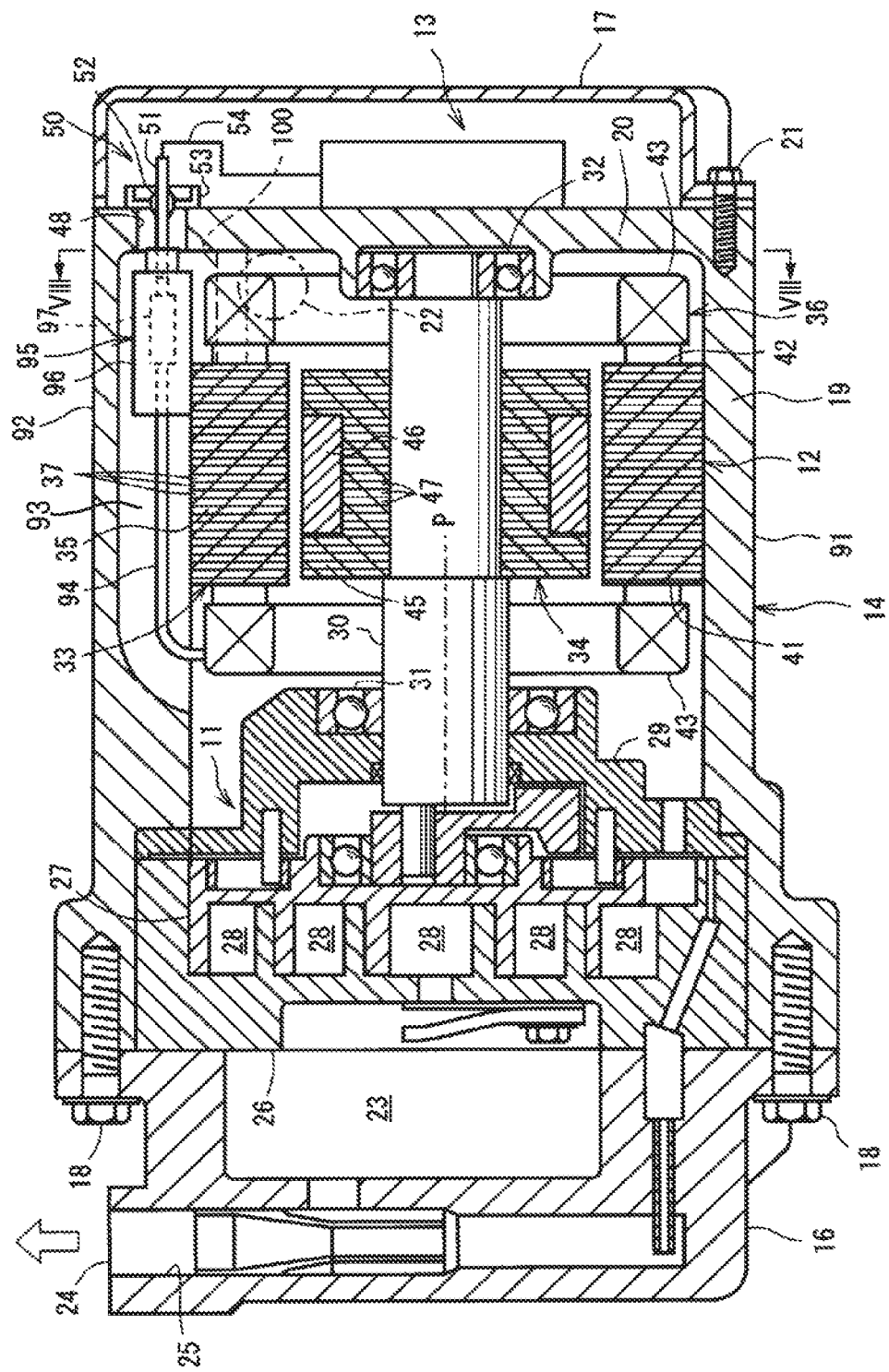
FIG. 7 is a longitudinal sectional view of an electric compressor according to a third embodiment of the present invention.
Figure 8:
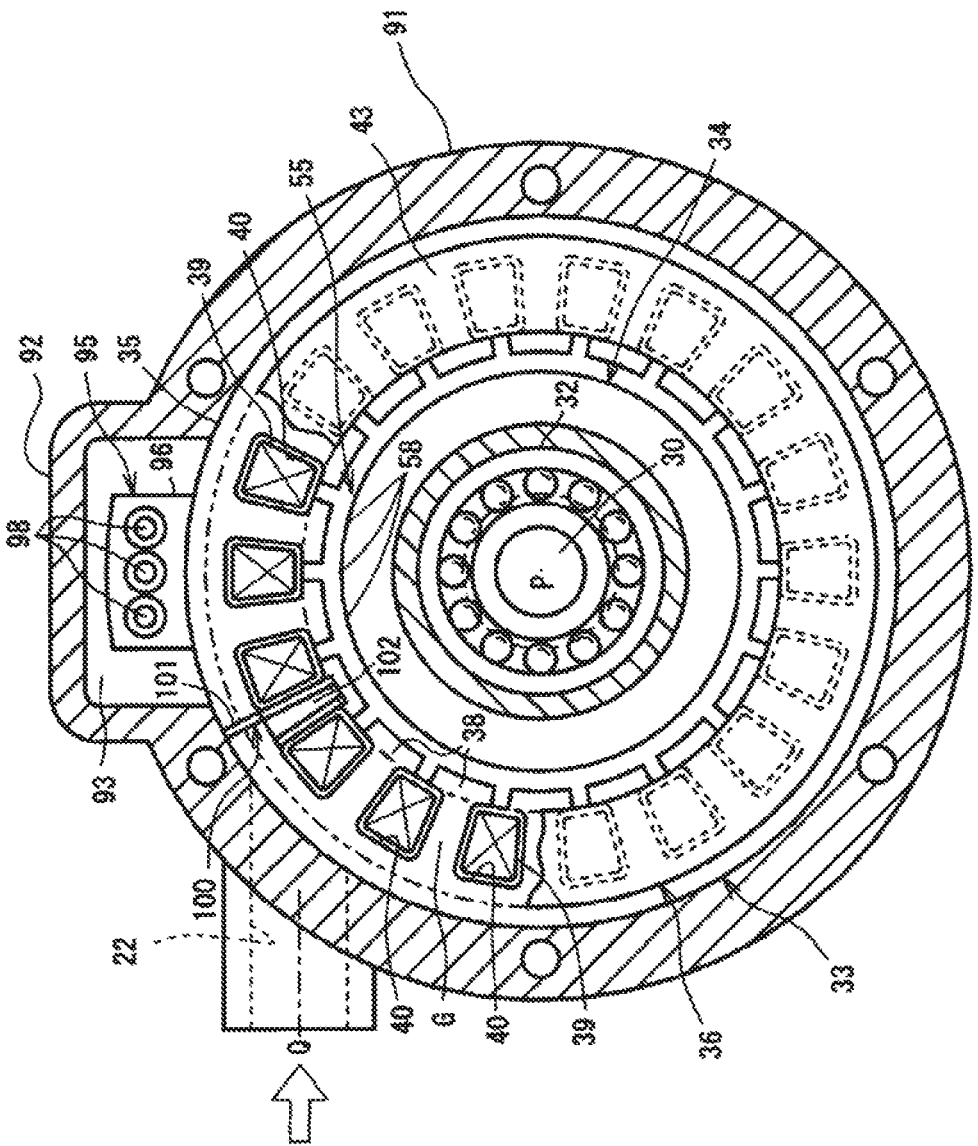
FIG. 8 is a transverse sectional view taken along line VIII-VIII of FIG. 7.
Figure 9:
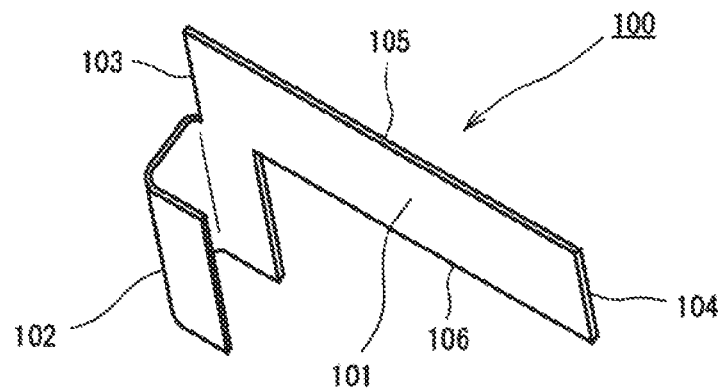
FIG. 9 is a perspective view of the shield plate of the electric compressor according to the third embodiment of the present invention.

The following will describe an electric compressor according to a third embodiment of the present invention with reference to FIGS. 7, 8, and 9. The electric compressor according to the third embodiment differs from the electric compressor according to the first embodiment in that the cluster block is disposed radially outward of the coil ends. Therefore, the configuration and the components that correspond to those of the first embodiment will be designated by the same reference numerals and the detailed description thereof may be omitted or simplified.

As shown in FIGS. 7 and 8, the electric compressor according to the third embodiment includes a first housing member 91 having a raised portion 92 that is formed so as to rise radially outwardly. The raised portion 92 has therein a space 93, and a cluster block 95, which will be described later, is accommodated in the space 93. As shown in FIG. 7, the space 93 is in communication with a space formed between the first housing member 91 and the coil end 43.

As shown in FIG. 7, in the electric motor portion 12, the coil ends 43 on the opposite sides of the coils 36 project from the stator core 35. Lead wires 94 for U, V, and W phases (only one lead wire 94 is shown in FIG. 7) extend from the coil end 43 near the compression portion 11.

The first housing member 91 has therein a rectangular box-shaped cluster block 95. The cluster block 95 is disposed radially outward of the coil ends 43 and coupled to the stator 33. The cluster block 95 forms a part of the electric motor portion 12. The cluster block 95 includes a main body 96 made of an insulating resin. A connection terminal 97 is accommodated in the main body 96 of the cluster block 95. Each lead wire 94 is connected at its one end to the connection terminal 97. Three insertion holes 98 are formed through an end surface of the main body 96 that is located near the motor drive circuit portion 13. The other ends of the metallic terminals 51 are inserted through their corresponding insertion holes 98 and electrically connected to the connection terminal 97.

A shield plate 100 as the shield member of the present invention is mounted on the outer periphery of the coil end 43 near the motor drive circuit portion 13. The shield plate 100 is adapted to block the flow of refrigerant that is taken in through the refrigerant inlet 22 and flowing toward the cluster block 95 and the metallic terminals 51 so that the metallic terminals 51 are prevented from being cooled. The shield plate 100 includes a rectangular body portion 101 and an engaging portion 102 formed integrally with the body portion 101. The engaging portion 102 is adapted to be engaged with the coil end 43 near the motor drive circuit portion 13. The shield plate 100 is made of an insulating resin having resistance properties against refrigerant.

The shield plate 100 is mounted to the outer periphery of the coil end 43 in such a manner that the body portion 101 of the shield plate 100 is located between the refrigerant inlet 22 and the cluster block 95 and the plane of the body portion 101 extends in a radial direction of the stator core 35. Thus, the shield plate 100 divides the space formed by the inner peripheral surface of the first housing member 91 and the coil end 43 at a position between the refrigerant inlet 22 and the space 93 of the raised portion 92 of the first housing member 91 in the circumferential direction. According to the third embodiment, with the engaging portion 102 inserted in the gap G, the shield plate 100 is pressed against the coil end 43 near the motor drive circuit portion 13 by the elasticity of the engaging portion 102 and the shield plate 100 is held securely in the coil end 43.

Referring to FIG. 9, the body portion 101 of the shield plate 100 includes a first edge 103, a second edge 104, a third edge 105, and a fourth edge 106. The third edge 105 and the fourth edge 106 are opposite to each other in the direction of the axial line P (in the axial direction of the electric compressor), and the first edge 103 and the second edge 104 are opposite to each other in the radial direction of the coils 36. The distance between the third edge 105 and the fourth edge 106 of the body portion 101 of the shield plate 100 is slightly shorter than the distance between the end surface 42 of the stator core 35 and the inner wall surface of the bottom portion 20 of the first housing member 91 as measured in the axial direction of the electric compressor. The distance between the first edge 103 and the second edge 104 of the body portion 101 is substantially equal to the distance between the coil end 43 and the inner peripheral surface of the first housing member 91 as measured in the radial direction of the coils 36. Although the body portion 101 of the shield plate 100 according to the third embodiment has an area that is smaller than the opening area of the refrigerant inlet 22, blocking of the flow of refrigerant is achieved by dividing the space between the inner peripheral surface of the first housing member 91 and the coil end 43.

The engaging portion 102 extends from a part of the fourth edge 106 near the first edge 103 and has a substantially U-shaped cross section. The engaging portion 102 inserted in the gap G of the coil end 43 is pressed against the coil end 43 by the elasticity of the engaging portion 102. By the elastic action of the engaging portion 102, the shield plate 100 is held securely in the coil end 43.

According to the third embodiment, even though the cluster block 95 is mounted on the outer periphery of the coil end 43, condensation of the moisture is prevented on and around the part of the metallic terminals 51 near the motor drive circuit portion 13 and the ease of assembly of the electric compressor is enhanced. It is preferable that the shield plate 100 be located close to the refrigerant inlet 22.

Fourth Embodiment

Figure 10A:
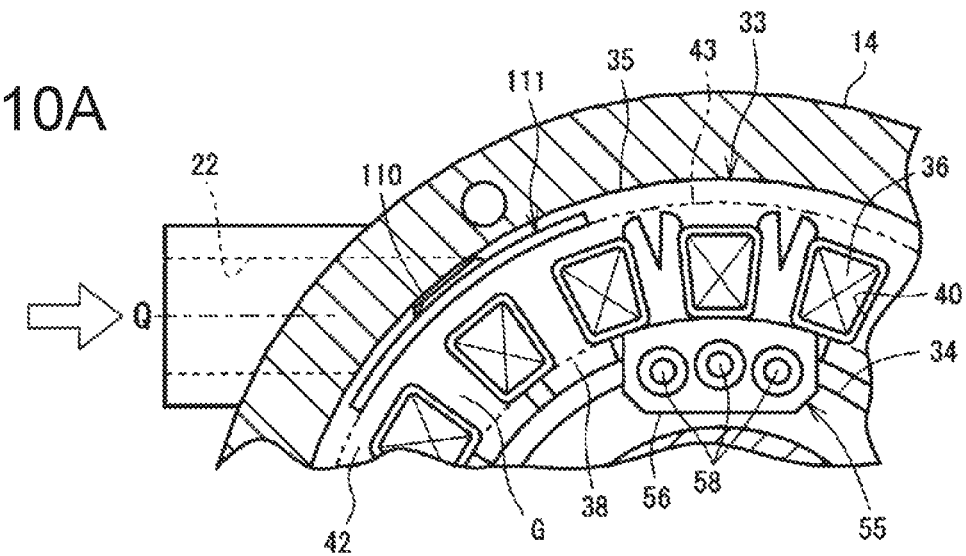
FIG. 10A is a fragmentary cross-sectional view showing a relevant part of an electric compressor according to a fourth embodiment of the present invention.
Figure 10B:
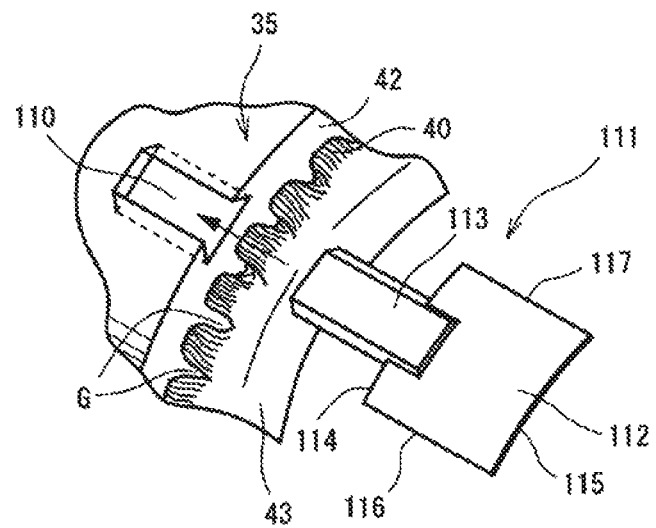
FIG. 10B is a perspective view of a shield plate of the electric compressor according to the fourth embodiment of the present invention.

The following will describe an electric compressor according to a fourth embodiment of the present invention with reference to FIGS. 10A and 10B. The electric compressor according to the fourth embodiment differs from the electric compressor according to the first embodiment in that the shield plate as the shield member of the present invention is mounted to the stator core. Therefore, the configuration and the components that correspond to those of the first embodiment will be designated by the same reference numerals and the detailed description thereof may be omitted or simplified.

Referring to FIG. 10A, the stator core 35 has in the outer periphery thereof a dovetail groove 110 extending in the axial direction of the stator core 35. The dovetail groove 110 corresponds to the groove of the present invention. The dovetail groove 110 has a cross section of a trapezoidal shape. A shield plate 111 which includes a body portion 112 and an engaging portion 113 formed integrally with the body portion 112 so that the shield plate 111 is held by the stator core 35. The dovetail groove 110 is adapted to receive the engaging portion 113 of the shield plate 111. The shield plate 111 corresponds to the shield member of the present invention. The body portion 112 has a first edge 114, a second edge 115, a third edge 116, and a fourth edge 117. The first edge 114 and the second edge 115 are opposite to each other in the axial direction of the stator core 35, and the third edge 116 and the fourth edge 117 are opposite to each other in the circumferential direction of the stator core 35. The distance between first edge 114 and the second edge 115 or the axial dimension of the body portion 112 is slightly smaller than the distance between the end surface 42 of the stator core 35 and the inner wall surface of the bottom portion 20 of the first housing member 91 as measured in the axial direction. The thickness of the body portion 112 is determined in accordance with the distance between the coil end 43 and the inner peripheral surface of the first housing member 91.

The engaging portion 113 is formed of a strip having a thickness and a shape conforming to the dovetail groove 110 so as to be engageable therewith. Inserting the engaging portion 113 into the dovetail groove 110 establishes an engagement therebetween and the shield plate 111 is held securely by the stator core 35.

According to the fourth embodiment of the present invention, even in the case that the provision of a shield member to the coil end 43 is not feasible, the mounting of the shield plate 111 to the electric motor portion 12 is achieved by inserting the engaging portion 113 of the shield plate 111 into the dovetail groove 110 of the stator core 35.

It is to be noted that the present invention is not limited to the above-described first to fourth embodiments and their modifications, and may variously be modified within the scope of the present invention. For example, the present invention may be modified as exemplified below.

According to the above embodiments, the shield member is provided to the coil end, the cluster block, or the stator core of the electric motor portion. However, the location of the shield member is not particularly limited as long as the shield member is provided in the electric motor portion. For example, if the electric motor portion includes a bobbin, the shield member may be mounted to the bobbin. Furthermore, the shield member may be formed integrally with the bobbin of the motor.

According to the second embodiment, the shield member is formed integrally with the cluster block. However, the shield member and the cluster block may be provided as separate individual members. Alternatively, the shield member may be provided to the cluster block of the third embodiment.

According to the first embodiment and the modifications and the variant thereof, the shield member has an area that is larger than the opening area of the refrigerant inlet. According to the present invention, however, the shield member may have an area smaller than the opening area of the refrigerant inlet, as in the case of the shield member of the third embodiment.

According to the first to third embodiments and the modifications thereof, the shield plate is used as the shield member. According to the present invention, however, the form of the shield member is not limited to a plate and may be of any other appropriate form. Furthermore, the shape of the shield member is not limited to a rectangular and may be optional as long as the shield member is capable of blocking the flow of refrigerant.

According to the first to fourth embodiments and the modifications, the shield member is located radially outward of the coil end. However, the shield member may be located radially inward of the coil end.

What is claimed is:

1. An electric compressor comprising:
a compression portion that compresses refrigerant with rotation of a rotary shaft;
an electric motor portion that includes a stator core on which a coil is wound and a rotor coupled to the rotary shaft and drives the compression portion through the rotary shaft;
a motor drive circuit portion that drives the electric motor portion;

a housing in which the compression portion, the electric motor portion, and the motor drive circuit portion are arranged in this order in an axial direction of the rotary shaft;

a partition wall that forms a part of the housing and separates the electric motor portion from the motor drive circuit portion;

a refrigerant inlet that is disposed at a position in the housing that is closer to the partition wall than to the compression portion;

a conductive member that is provided through the partition wall and electrically connects the motor drive circuit portion and the electric motor portion; and a cluster block disposed in the housing, the cluster block including a connection terminal that is configured to electrically connect a lead wire extending from the coil to the conductive member, wherein the electric compressor includes a shield member configured to block flow of refrigerant taken in through the refrigerant inlet and flowing toward the conductive member, wherein the shield member is a separate member from the cluster block, the shield member is disposed in the electric motor portion so as to be located between the refrigerant inlet and the conductive member, and the shield member does not contact the conductive member.

2. The electric compressor according to claim 1, wherein the refrigerant inlet is disposed so as to face toward a coil end projecting from the stator core.

3. The electric compressor according to claim 1, wherein the shield member includes:

a body portion adapted to block flow of the refrigerant; and an engaging portion formed integrally with the body portion and adapted to be engaged with the electric motor portion.

4. The electric compressor according to claim 3, wherein the body portion of the shield member has an area that is larger than an opening area of the refrigerant inlet.

5. The electric compressor according to claim 3, wherein the engaging portion is engaged with a coil end projecting from the stator core.

6. The electric compressor according to claim 5, wherein the body portion includes a contacting portion for contacting with an end surface of the coil end.

7. The electric compressor according to claim 1, wherein the stator core has in an outer periphery thereof a groove adapted to receive the shield member, and the shield member is held by the stator core by being inserted into the groove.

* * * * *